United States Patent
Hsieh

(10) Patent No.: US 9,729,420 B2
(45) Date of Patent: Aug. 8, 2017

(54) DECREASING USB INTERFERENCE TO ADJACENT WIRELESS DEVICE

(75) Inventor: Chang-Cheng Hsieh, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 362 days.

(21) Appl. No.: 14/397,208

(22) PCT Filed: Apr. 26, 2012

(86) PCT No.: PCT/CN2012/074764
§ 371 (c)(1),
(2), (4) Date: Jan. 26, 2015

(87) PCT Pub. No.: WO2013/159312
PCT Pub. Date: Oct. 31, 2013

(65) Prior Publication Data
US 2015/0134863 A1    May 14, 2015

(51) Int. Cl.
*G06F 13/42* (2006.01)
*H04L 12/26* (2006.01)
*H04B 15/04* (2006.01)
*H04W 52/02* (2009.01)

(52) U.S. Cl.
CPC ...... *H04L 43/0894* (2013.01); *G06F 13/4286* (2013.01); *H04B 15/04* (2013.01); *H04W 52/0203* (2013.01); *Y02B 60/50* (2013.01)

(58) Field of Classification Search
None
See application file for complete search history.

(56) References Cited

U.S. PATENT DOCUMENTS

| 5,926,501 A | 7/1999 | Souissi et al. |
| 6,618,776 B1 * | 9/2003 | Zimmermann ..... G06F 13/4295 375/240 |

(Continued)

FOREIGN PATENT DOCUMENTS

| CN | 101751361 A | 6/2010 |
| JP | 2006330831 A | 12/2006 |
| WO | WO-2007105816 | 9/2007 |

OTHER PUBLICATIONS

International Search Report and Written Opinion received in related PCT Application No. PCT/CN2012/074764, mailed on Feb. 7, 2013.

*Primary Examiner* — Henry Tsai
*Assistant Examiner* — Juanito Borromeo
(74) *Attorney, Agent, or Firm* — HP Patent Department

(57) ABSTRACT

Decreasing interference of a first device operating according to high speed serial bus standard on a second device operating according to another different communication standard is provided. The method can include obtaining a first signal strength received by the second device before connection of the first device. The method can include obtaining a second signal strength received by the second device after connection of the first device and comparing the first signal strength and the second signal strength. If decrease of the second signal strength in comparison with the first signal strength exceeds a predetermined threshold, a command can be sent to the first device to enable the first device to operate at a lower bandwidth than the high speed serial bus standard.

15 Claims, 3 Drawing Sheets

(56) References Cited

U.S. PATENT DOCUMENTS

| | | | |
|---|---|---|---|
| 6,839,793 B2 * | 1/2005 | Ragland | G06F 13/4022 |
| | | | 710/316 |
| 6,961,341 B1 * | 11/2005 | Krishnan | H04J 3/1682 |
| | | | 370/412 |
| 7,676,197 B2 | 3/2010 | Lin et al. | |
| 2006/0035590 A1 | 2/2006 | Morris et al. | |
| 2009/0176454 A1 | 7/2009 | Chen et al. | |
| 2011/0081858 A1 | 4/2011 | Tolentino et al. | |

* cited by examiner

DECREASING USB INTERFERENCE TO ADJACENT WIRELESS DEVICE

BACKGROUND

With the increasing development and deployment of Vista operating system, high-definition video and DX10, high volume and high speed data transmission is growing and its requirement on the bandwidth is also increasing. As a result, USB1.0 and USB2.0 cannot meet the need in the future.

USB 3.0 delivers an unprecedented bandwidth, 10 times that of USB 2.0, and supports full-duplex communication, or the ability to send and receive data simultaneously. It also improves Quality of Service (QoS) and overall bus power consumption thanks to advanced data error checking coupled with smart power savings from USB 3.0 link power management.

BRIEF DESCRIPTION OF THE DRAWINGS

The accompanying drawings illustrate various examples of various aspects of the present disclosure. It will be appreciated that the illustrated element boundaries (e.g., boxes, groups of boxes, or other shapes) in the figures represent one example of the boundaries. It will be appreciated that in some examples one element may be designed as multiple elements or that multiple elements may be designed as one element. In some examples, an element shown as an internal component of another element may be implemented as an external component and vice versa.

DETAILED DESCRIPTION

Modern portable computers (e.g. notebook computer or laptop) or desktop computers are often provided with a plurality of communication interfaces or modules to operate in different frequency ranges according to different protocols. Examples of such interfaces or modules comprises a Bluetooth interface, a WLAN interface, a USB3.0 interface, etc. It has been recognized that, due to high speed transmission (with an actual transmission rate of 3.2 Gbps and a maximum of 5.0 Gbps) of USB 3.0, the noise strength of differential signals of USB3.0 is much higher than that of USB2.0 device, about 30 dbm higher from 1 GHz to 3 GHz. Therefore, when a USB3.0, which is a high speed serial bus standard, device plugs into (i.e. connects to) for example a notebook computer, this kind of high speed operation of USB3.0 device would probably severely affect its nearby wireless devices.

For example, when there are two USB3.0 ports on a notebook computer, with one of the USB 3.0 ports being plugged by a USB3.0 Hard Disk Drive (HDD) and another USB3.0 port being plugged by a USB2.0 proprietary wireless mouse transceiver, the noise interference issue would happen. The mouse's cursor would have a lag issue (i.e. cannot move smoothly) on the notebook's display. In addition, the detection range of the USB 2.0 mouse transceiver would degrade from 3-5 m to 0.5-1 m and the broad band noise coupling increases about 20-30 db in adjacent to USB 3.0 port.

This noise of USB3.0 can also interfere with operations of other wireless modules such as a WLAN module and a Bluetooth module which are collocated, in the notebook computer with the USB3.0 device. For example, for an embedded WLAN module, its throughput would be affected. For a Bluetooth device (e.g. a paired BT headset device), its detection range would degrade from 8 m to 5-6 m.

When the USB3.0 device is a commonly used flash memory, because it does not have the casing of USB3.0 HDD, the noise interference issue will be more severe. As is known to those skilled in the art, the interference mainly comes from the external USB3.0 device and a USB3.0 controller in the notebook computer that controls the operation of the USB3.0 device.

In the following, the Bluetooth and WLAN will be taken as examples to describe the interference of USB3.0 device to other nearby wireless device. However, it can be appreciated that USB3.0 device also interferes with other wireless device adjacent to the USB3.0 device, and operating according to other protocols or standards. Also, it can be appreciated that, the phrase "interference of USB3.0 device" refers to both interference from the USB3.0 device and interference from the USB3.0 controller.

Figure 1:
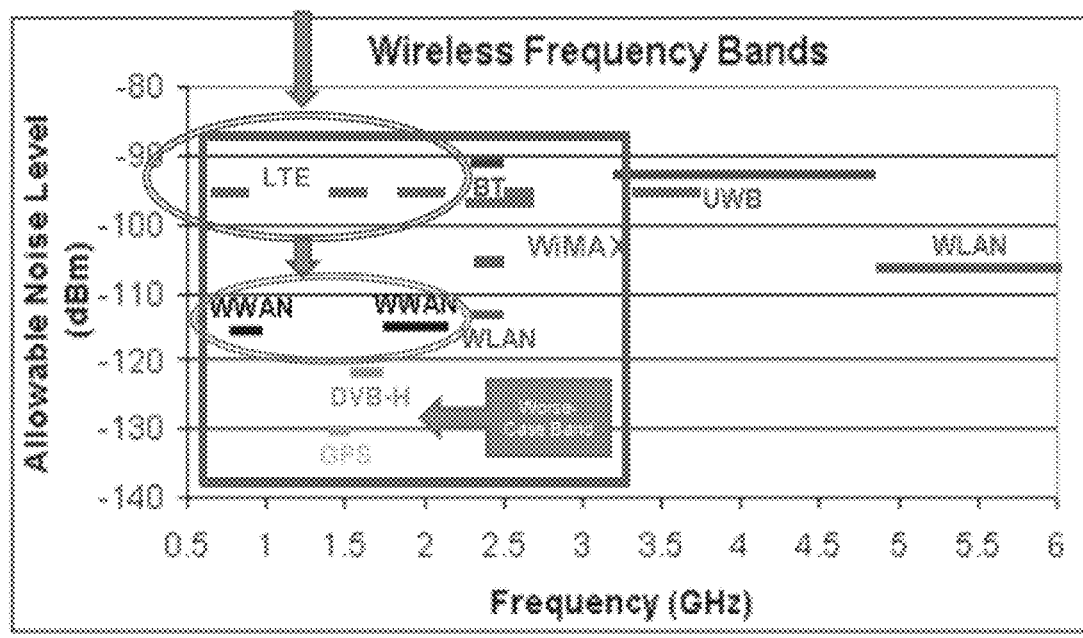
FIG. 1 illustrates a schematic view of frequency range that can be influenced by a USB3.0 device.

FIG. 1 illustrates a frequency range that USB3.0 device may interfere. As shown in FIG. 1, the vertical axis of FIG. 1 shows the allowable noise level in units of dbm and its horizontal axis shows frequency in units of GHz. For example, the resolution bandwidth (RBW) of LTE is 10 MHz and its allowable noise level is −95 dbm, that is, in order to ensure normal operations of LTE, the noise limit is −95 dbm. For example, the RBW of WWAN is 200 KHz and its allowable noise level is −112 dbm. As described above, from 1 GHz to 3 GHz, the differential signal noise strength of USB3.0 device is about 30 dbm higher than that of USB2.0 device. Thus, as shown in FIG. 1, LTE, WWAN, WLAN, BT, UWB, WiMAX, DVB-H and GPS will all be affected by the USB 3.0 device.

Figure 2:
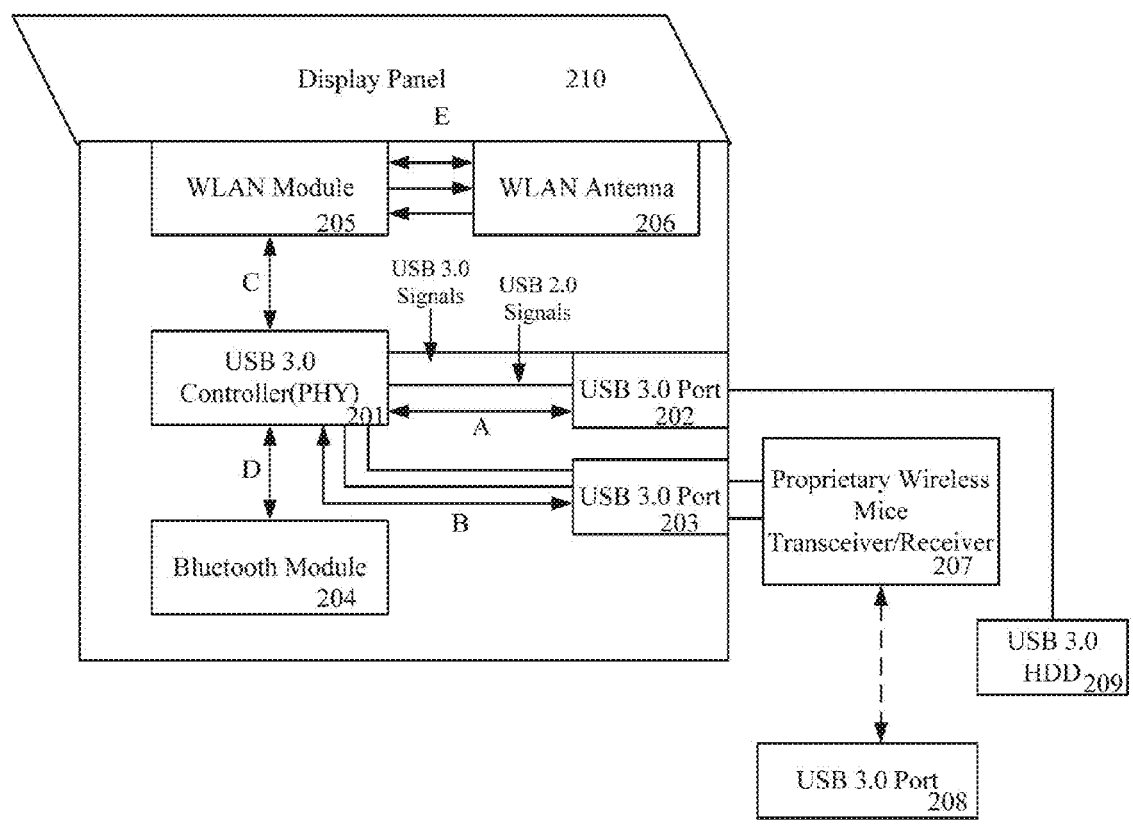
FIG. 2 illustrates a schematic view of a system according to an example of the present disclosure.

With reference to FIG. 2 now, FIG. 2 illustrates a schematic diagram of a system 200 in which an example of the present disclosure can be used. The system 200 can be a notebook computer, a laptop computer, a desktop computer, a personal digital assistant or other electronic devices. As shown in FIG. 2, the system 200 can be configured with two USB 3.0 ports 202, 203 and a USB 3.0 controller 201 which controls operation of the USB 3.0 ports. A USB 3.0 HDD 209 is coupled to the USB3.0 port 202, for transmitting data to/from the system 200. Here, the USB3.0 HDD 209 is illustrated as an example, and other USB 3.0 devices such as a USB3.0 flash memory or a camera with a USB 3.0 interface can also be coupled to the USB3.0 port 202.

Because a USB3.0 port is compatible with USB2.0, a USB2.0 proprietary wireless mouse transceiver 207 can be coupled to the other USB3.0 port 203, wherein a USB2.0 wireless mouse 208 is coupled to the USB2.0 proprietary wireless mouse transceiver 207 wirelessly. USB2.0 has a lower bandwidth than the high speed serial bus USB 3.0. As shown by two signal lines labeled as usb3.0 signal and usb2.0 signal respectively in FIG. 2, the USB3.0 controller 201 generates two different USB control signals (i.e. USB3.0 signal and USB2.0 signal) to control the USB3.0 ports to operate according to USB3.0 standard or USB2.0 standard. In addition, the system 200 can also include a Bluetooth module 204, a WLAN module 205 and a WLAN antenna 206. Please be noted that although not shown, the Bluetooth module 204 also has an antenna connected thereto. The Bluetooth module 204 can be paired with another BT device (not shown) to transmit data between them, such as a BT headset. The system 200 can also communicate with other device within a same WLAN by using the WLAN antenna 206 and the WLAN module 205.

As described before, when the USB3.0 HDD 209 plugs in the USB port 202 and operates according to USB3.0 standard, because of high data transmission rate, the USB3.0 device 209 will interfere with the Bluetooth module 204 and the WLAN module 205 and WLAN antenna 206 that are located near the USB3.0 device 209. During normal operations, the noise level in the WLAN and Bluetooth modules is usually less than −89 dbm. After the USB3.0 device 209 is plugged in, the noise level in the WLAN and Bluetooth modules will increase significantly, which will for example affect the throughput of the WLAN module and degrade the detection range of the Bluetooth module. Moreover, the USB3.0 device 209 will also interfere with the communication between the USB2.0 wireless transceiver 207 and the USB mouse 208 which are operating according to USB2.0 standard. For example, after plug-in of the USB3.0 device 209, the operation of the USB mouse will have lag issue and its detection range is also degraded.

In order to mitigate noise interference of the USB3.0 device 209, according to an example of the present disclosure, the WLAN module 205 is configured to detect or measure the strength of signal received by the WLAN antenna 206 and the Bluetooth module 204 is configured to detect the strength of signal received by a Bluetooth antenna. In this example, the signal strength is represented by Received Signal Strength indicator (RSSI) in units of dbm.

The USB3.0 controller 201 is for example configured to obtain from the WLAN module 205 and/or the Bluetooth module 204 signal strengths respectively measured by these modules before and after plug-in of the USB3.0 device 209. According to an example, the WLAN module 205 and the Bluetooth module 204 can continuously measure the signal strength received by its antenna and send the measured signal strength to the USB3.0 controller, as shown by signal line C and D in FIG. 2. In order to monitor interference of plug-in of USB3.0 device 209 to other wireless communication modules, the USB3.0 controller 201 needs to obtain both a signal strength before plug-in of USB3.0 device 209 and a signal strength after plug-in of USB3.0 device 209. For the signal strength before plug-in of USB3.0 device 209, the modules can measure the signal strength before plug-in of USB3.0 device 209 and send it to the USB3.0 controller 201, as described above. Alternatively, the USB 3.0 controller 201 can obtain a signal strength measured by the WLAN module 205 or the Bluetooth module 204 upon detection of plug-in of USB3.0 device 209 and use this signal strength as the signal strength before plug-in of USB3.0 device 209. As can be appreciated by those skilled in the art, when the USB3.0 device 209 is just plugged in, its interference to other adjacent wireless communication modules is very small and thus if a signal strength is measured at this time, it can represent the signal strength before plug-in of USB3.0 device 209. According to another example, before or after plug-in of USB3.0 device 209, the USB 3.0 controller 201 can be configured to send a request to the WLAN module 205 or the Bluetooth module 204 for the signal strength received by them. The WLAN module 205 and the Bluetooth module 204 can send their measured signal strengths to the USB 3.0 controller 201 in response to this request. According to yet another example, the USB 3.0 controller 201 can be configured to obtain these signal strengths periodically. In an example, the USB 3.0 controller 201 can perform averaging over the signal strength received in a predetermined period of time and use this average as the signal strength before or after plug-in of USB3.0 device 209. In this way, accuracy of the system can be improved.

In addition, the USB 3.0 controller 201 can be further configured to compare the signal strength before plug-in of USB3.0 device 209 and the signal strength after plug-in of USB3.0 device 209. Here, the USB 3.0 controller 201 can compare either or both of the signal strengths detected by the WLAN module 205 and the Bluetooth module 204. In the following, the signal strength detected by the WLAN module 205 is taken as example for illustration. But it will be understood that the operations described below also apply to the signal strength detected by the Bluetooth module 204 or other wireless communication modules. If it is determined by comparison that plug-in of USB3.0 device 209 have affected normal operation of the WLAN module 205, for example when the signal strength after plug-in USB3.0 device 209 has decreased by a certain threshold or more, then the USB3.0 controller 201 can be configured to send a command to the USB3.0 port 202, for example by changing the USB operation signal from USB3.0 signal to USB2.0 signal, to enable the USB3.0 device 209 to operate according to USB2.0 standard, so that the interference of USB3.0 device 209 to other wireless communication modules such as modules 205 and 204 can be decreased by lowering the transmission rate of the USB3.0 device 209. For example, the threshold can be set as 10 dbm, that is, after plug-in of USB3.0 device 209, if the system noise raises above −79 dmb, then the USB3.0 controller 201 can send a command to USB port 202 to lower the transmission rate of the USB3.0 device 209.

In the above example, the USB3.0 controller 201 obtains from wireless communication modules such as WLAN module 205 and Bluetooth module 204 signal strengths which are detected by these modules before and after plug-in of the USB3.0 device 209 and compares these obtained signal strengths. Alternatively, according to another example, the communication module such as WLAN module 205 or Bluetooth module 204 can compare its detected signal strengths before and after plug-in of the USB3.0 device 209. If it is determined through comparison that decrease of signal strength has exceeded the threshold, then the WLAN module 205 or Bluetooth module 204 can send an enable signal to the USB 3.0 controller 201 to drive the USB 3.0 controller 201 to change the USB operation signal from the USB3.0 signal to USB2.0 signal, such that the USB3.0 device 209 will operate according to the USB2.0 standard.

Figure 3:
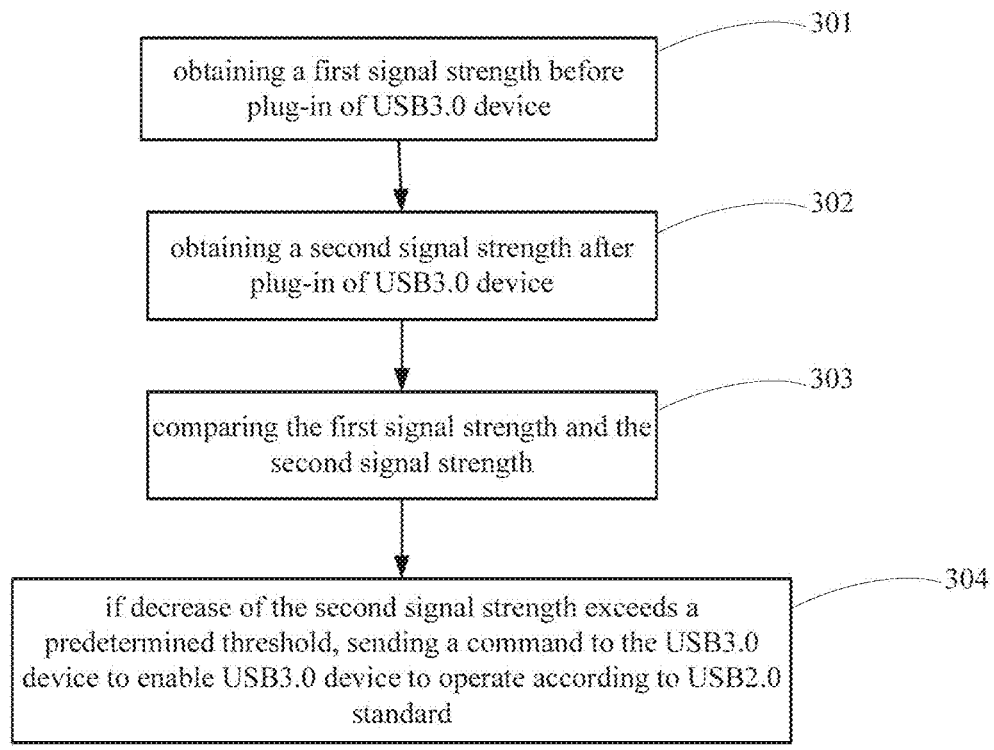
FIG. 3 illustrates a flow chart of a method for decreasing interference of a USB 3.0 device according to an example of the present disclosure.

With reference to FIG. 3 now, FIG. 3 illustrates a flow chart of a method for decreasing interference of a USB 3.0 device according to an example of the present disclosure. According to an example, the method of FIG. 3 can be implemented by the USB 3.0 controller 201. According to another example, the method can be implemented by the USB3.0 controller 201 in combination with other wireless communication modules such as WLAN module 205 or Bluetooth module 204. As shown by FIG. 3, at block 301, a first signal strength received by a communication module before plug-in of a USB3.0 device (e.g. USB3.0 HDD or flash memory) is obtained, wherein the communication module is operating according to another different wireless communication protocol other than USB3.0 standard. According to an example, the communication module can be a Bluetooth or a WLAN module. According to an example, the signal strength before plug-in of the USB3.0 device can be measured continuously or periodically by the communication module before plug-in of the USB3.0 device and provided to the USB3.0 controller. The USB3.0 controller saves the received signal strength for subsequent operations. Alternatively, the USB3.0 controller can further process the received signal strength before other operations. For example, the USB 3.0 controller can perform averaging over the received signal strengths in a predetermined period of time to decrease noises from other sources. In addition, because when the USB3.0 device is just plugged in, the signal strength received by other communication modules such as the WLAN module or the Bluetooth module is not significantly interfered by the USB3.0 device, therefore the signal strength received by the communication module can be measured at the time of plug-in of USB3.0 device (i.e. upon detection of the plug-in) and this measured signal strength can be used as the signal strength before plug-in of the USB3.0 device. Next, as shown at 302, a signal strength measured by the communication module after plug-in of USB3.0 device is obtained. As the case before plug-in of USB3.0 device, obtaining of the signal strength after plug-in of the USB3.0 device can be achieved by the communication module measuring continuously or periodically the signal strength after plug-in and sending it to the USB3.0 controller. Likewise, the USB3.0 controller can perform some processing (e.g. averaging) on the obtained signal strength before further operations. In addition, in block 301 and block 302, obtaining of the signal strength before and after plug-in of the USB3.0 device can be implemented in a request-response manner. For example, the USB3.0 controller can send a request to the communication module for the signal strength measured by it and in response to this request, the communication module can send its measured signal strength to the USB3.0 controller. Such a request can be made periodically before plug-in of USB3.0 device, upon detection of such plug-in (the signal strength at this time is approximately equal to the signal strength before plug-in), or at a predetermined time after plug-in of USB3.0 device (the signal strength at this time is approximately equal to the signal strength after plug-in). As shown in block 303, the signal strength before plug-in is compared with the signal strength after plug-in, to control the USB3.0 device based on the comparison result. At block 304, if it is determined by comparison that the signal strength after plug-in of USB3.0 device decreases by a certain threshold or more, then the USB3.0 controller can send a command to the USB3.0 device through the USB3.0 port connected therewith (for example changing the operation signal of USB3.0 device from USB3.0 signal to USB2.0 signal) to enable the USB3.0 device to operate according to USB2.0 standard. Once the USB3.0 device has degraded to operate according to USB2.0 standard, its transmission rate would decrease (e.g. from 480 Mbps to 5 Mbps) and its interference to other communication modules can also be decreased, so that the other communication modules such as a WLAN module or a Bluetooth module can operate normally.

As described above, said comparing can be carried out by the WLAN module 205 or Bluetooth module 204 other than the USB3.0 controller. If it is determined through comparison that decrease of signal strength has exceeded the threshold, then the WLAN module or Bluetooth module can send an enable signal to the USB 3.0 controller to drive the USB3.0 controller to change the USB operation signal from the USB3.0 signal to USB2.0 signal, such that the USB3.0 device 209 will operate according to the USB2.0 standard.

In an electronic system, in order to ensure normal operation, the system noise should be less than −89 dbm. When the system noise rises to −79 dbm or above, the normal operation of other communication modules would be severely impacted. Therefore, according to an example, the threshold can be set as 10 dbm. However, those skilled in the art can adjust said threshold according to needs and actual applications or system designs.

Figure 4:
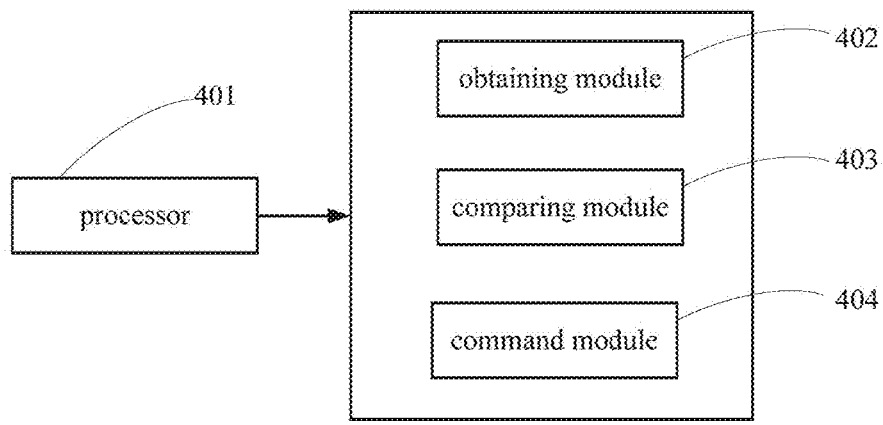
FIG. 4 is a block diagram showing a non-transitory, computer-readable medium that stores code for decreasing interference of a USB 3.0 device according to an example of the present disclosure.

With reference to FIG. 4, FIG. 4 is a block diagram showing a non-transitory, computer-readable medium that stores code for decreasing interference of a USB 3.0 device according to an example of the present disclosure. The non-transitory, computer-readable medium is generally referred to by the reference number 400.

The non-transitory, computer-readable medium 400 may correspond to any typical storage device that stores computer-implemented instructions, such as programming code or the like. For example, the non-transitory, computer-readable medium 800 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 402 generally retrieves and executes the computer-implemented instructions stored in the non-transitory, computer-readable medium 400 for decreasing interference caused by a USB 3.0 device. At block 404, an obtaining module may obtain signal strengths detected by other communication modules such as a WLAN module or a Bluetooth module before and after plug-in of a USB3.0 device. A comparing module 406 may compare the signal strengths before and after plug-in of a USB3.0 device and determine whether the decrease of the signal strength has exceeded a certain threshold. At block 408, a command module may send a command to the USB3.0 device to enable it to operate according to USB2.0 standard if the comparing module determines that the decrease of the signal strength has exceeded a certain threshold.

Although the above description uses the USB3.0 standard and USB2.0 standard, it will be understood that these standards just serve as examples to illustrate the present invention and that the present invention is not limited in this regard. Instead, the principle discussed herein can be applied to any other high speed serial bus standard and any other standard that has a lower bandwidth than the high speed serial bus standard.

The figures are only illustrations of an example of the present disclosure, wherein the modules or procedure shown in the figures are not necessarily essential for implementing the present disclosure. Moreover, the sequence numbers of the above examples are only for description, and do not indicate an example is more superior to another.

Those skilled in the art can understand that the modules in the device in the example can be arranged in the device in the example as described in the example, or can be alternatively located in one or more devices different from that in the example. The modules in the aforesaid example can be combined into one module or further divided into a plurality of sub-modules.

Although the flow diagrams described above show a specific order of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The invention claimed is:

1. A method for decreasing interference, cause by a first device operating according to a high speed serial bus standard, on a second device operating on a portable computer according to a different communication standard, the method comprising:
    obtaining a first signal strength of the second device before a plug-in connection of the first device into a first interface of the portable computer;
    obtaining a second signal strength of the second device after the plug-in connection of the first device into the first interface;
    determining whether a decrease in signal strength between the first signal strength and the second signal strength exceeds a predetermined interference threshold; and
    when the decrease in signal strength exceeds the predetermined interference threshold, sending a command to the first device to cause the first device to operate at a lower bandwidth standard than the high speed serial bus standard.

2. The method of claim 1, wherein the first device comprises a USB 3.0 device, and wherein the first interface comprises a USB 3.0 input port.

3. The method of claim 1, wherein the second device operating on the portable computer according to the different communication standard comprises at least one of a Bluetooth, a USB 2.0 wireless, a LTE, a WWAN, a DVB-H, a GPS, a UWB, or a WiMAX device.

4. The method of claim 2, wherein the lower bandwidth standard comprises a USB 2.0 standard, and wherein the command causes the USB 3.0 device to operate according to the USB 2.0 standard.

5. The method of claim 4, wherein the method is performed by a USB 3.0 controller of the portable computer.

6. A portable computer comprising:
    a first interface enabling a plug-in connection with a first device operating according to a high speed serial bus standard;
    a wireless interface operating according to a wireless communication standard and being connected to a second device;
    a processor; and
    a memory device that stores instructions that, when executed by the processor, cause the processor to:
        obtain a first signal strength of the second device before the plug-in connection of the first device into the first interface;
        obtain a second signal strength of the second device after the plug-in connection of the first device into the first interface;
        determine whether a decrease in signal strength between the first signal strength and the second signal strength exceeds a predetermined interference threshold; and
        when the decrease in signal strength exceeds the predetermined interference threshold, send a command to the first device to cause the first device to operate at a lower bandwidth standard than the high speed serial bus standard.

7. The portable computer of claim 6, wherein the first device comprises a USB 3.0 device, and wherein the first interface comprises a USB 3.0 input port.

8. The portable computer of claim 6, wherein the second device operating according to the different communication standard comprises at least one of a Bluetooth, a USB 2.0 wireless, a LTE, a WWAN, a DVB-H, a GPS, a UWB, or a WiMAX device.

9. The portable computer of claim 7, wherein the lower bandwidth standard comprises a USB 2.0 standard, and wherein the command causes the USB 3.0 device to operate according to the USB 2.0 standard.

10. The portable computer of claim 9, wherein the processor executing the instructions comprises a USB 3.0 controller of the portable computer.

11. A non-transitory, computer-readable medium comprising code that, when executed by a processor, causes the processor to:
    obtain a first signal strength of a second device of a portable computer before a plug-in connection of a first device into a first interface of the portable computer, the first device operating according to a high speed serial bus standard;
    obtain a second signal strength of the second device after the plug-in connection of the first device into the first interface;
    determine whether a decrease in signal strength between the first signal strength and the second signal strength exceeds a predetermined interference threshold; and
    when the decrease in signal strength exceeds the predetermined interference threshold, send a command to the first device to cause the first device to operate according to a lower bandwidth standard than the high speed serial bus standard.

12. The non-transitory, computer-readable medium of claim 11, wherein the second device operating on the portable computer comprises at least one of a Bluetooth, a USB 2.0 wireless, a LTE, a WWAN, a DVB-H, a GPS, a UWB, or a WiMAX device.

13. The non-transitory, computer-readable medium of claim 11, wherein the first device comprises a USB 3.0 device, and wherein the first interface comprises a USB 3.0 input port.

14. The non-transitory, computer-readable medium of claim 13, wherein the lower bandwidth standard comprises a USB 2.0 standard, and wherein the command causes the USB 3.0 device to operate according to the USB 2.0 standard.

15. The non-transitory, computer-readable medium of claim 14, wherein the processor executing the code comprises a USB 3.0 controller of the portable computer.

* * * * *